(12) United States Patent
Heller et al.

(10) Patent No.: US 10,968,105 B2
(45) Date of Patent: Apr. 6, 2021

(54) LOW-TEMPERATURE PYROLYSIS OF ORGANIC ACID SALTS PROVIDING GRAPHENE RICH CARBONS

(71) Applicant: Board of Regents, The University of Texas System, Austin, TX (US)

(72) Inventors: Adam Heller, Austin, TX (US); Joo-Woon Lee, Austin, TX (US); David Eisenberg, Haifa (IL); Keith A. Friedman, Austin, TX (US); Sheryl Coffman, Dripping Springs, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 253 days.

(21) Appl. No.: 16/089,290

(22) PCT Filed: Mar. 28, 2017

(86) PCT No.: PCT/US2017/024581
§ 371 (c)(1),
(2) Date: Sep. 27, 2018

(87) PCT Pub. No.: WO2017/172800
PCT Pub. Date: Oct. 5, 2017

(65) Prior Publication Data
US 2020/0299136 A1    Sep. 24, 2020

Related U.S. Application Data

(60) Provisional application No. 62/313,960, filed on Mar. 28, 2016, provisional application No. 62/412,502, filed on Oct. 25, 2016.

(51) Int. Cl.
*C01B 32/184*    (2017.01)
*C01B 32/20*    (2017.01)

(52) U.S. Cl.
CPC ........... *C01B 32/184* (2017.08); *C01B 32/20* (2017.08); *C01B 2204/04* (2013.01); *C01P 2006/11* (2013.01); *C01P 2006/12* (2013.01)

(58) Field of Classification Search
CPC ... C01B 32/184; C01B 32/20; C01B 2204/04; C01B 32/182; C01B 32/198;
(Continued)

(56) References Cited

U.S. PATENT DOCUMENTS

| 2010/0313755 A1 | 12/2010 | Koros et al. |
| 2011/0100211 A1 | 5/2011 | Kiyono et al. |

(Continued)

FOREIGN PATENT DOCUMENTS

| CN | 103332688 | * 10/2013 | ............. C01B 31/04 |
| CN | 103332688 A | 10/2013 | |
| CN | 104108709 A | 10/2014 | |

OTHER PUBLICATIONS

Machine Translation of CN 103332688 to Shanxi Institute of Coal Chemistry (Year: 2013).*

(Continued)

*Primary Examiner* — Daniel C. McCracken
(74) *Attorney, Agent, or Firm* — Kilpatrick Townsend & Stockton LLP (57) ABSTRACT

Methods of pyrolytically producing carbons comprising graphene sheets at temperatures below 800° C. are disclosed. The graphene sheets, which are not substantially stacked, are formed by templating on hexagonal metal oxides, for example. Extensive stacking of the graphene sheets, which would lead to formation of graphite, is avoided at the low temperatures employed. Also provided are methods of producing heavily nitrogen doped graphene comprising carbons. Methods of using graphene and heavily nitrogen doped graphene are also disclosed.

56 Claims, 6 Drawing Sheets

(58) Field of Classification Search
CPC ............ C01B 2204/02; C01B 2204/06; C01B 2204/065; C01B 2204/22; C01B 2204/24; C01B 2204/26; C01B 2204/28; C01B 2204/30; C01B 2204/32; C01B 32/205; C01B 32/21; C01B 32/215; C01B 32/22; C01B 32/225; C01B 32/23; C01B 2204/20; C01P 2006/11; C01P 2006/12
See application file for complete search history.

(56) References Cited

U.S. PATENT DOCUMENTS

| | | |
|---|---|---|
| 2012/0042780 A1 | 2/2012 | Koros et al. |
| 2013/0152793 A1 | 6/2013 | Bhuwania et al. |
| 2013/0305921 A1 | 11/2013 | Kiyono et al. |
| 2014/0000454 A1 | 1/2014 | Singh et al. |
| 2014/0054490 A1 | 2/2014 | Sundara et al. |
| 2014/0178759 A1 | 6/2014 | Worsley et al. |
| 2015/0053079 A1 | 2/2015 | Karos et al. |
| 2015/0094445 A1 | 4/2015 | Bhuwania et al. |
| 2015/0167181 A1 | 6/2015 | Vaden et al. |
| 2015/0290596 A1 | 10/2015 | Koros et al. |
| 2016/0236939 A1 | 8/2016 | De Miguel Turullois et al. |

OTHER PUBLICATIONS

Eisenberg, et al., "A Simple Synthesis of an N-Doped Carbon ORR Catalyst: Hierarchical Micro/Meso/Macro Porosity and Graphitic Shells", Chemistry a European Journal, 2016, vol. 22, pp. 501-505, DOI: 10.1002/chem.201504568. Published online at www.chemeurj.org on Dec. 4, 2015.

Youn, et al., "Mixing Super P-Li with N-Doped Mesoporous Templated Carbon Improves the High Rate Performance of a Potential Lithium Ion Battery Anode", Journal of Electrochemical Society, 163, pp. A953-A957 (2016).

International Search Report and Written Opinion of PCT/US2017/024581 dated Jun. 27, 2017, all pages.

\* cited by examiner

LOW-TEMPERATURE PYROLYSIS OF ORGANIC ACID SALTS PROVIDING GRAPHENE RICH CARBONS

CROSS-REFERENCE TO RELATED APPLICATION

This application is a U.S. National Stage of PCT International Application No. PCT/US2017/024581, filed on Mar. 28, 2017, entitled "Low-Temperature Pyrolysis of Organic Acid Salts Providing Graphene Rich Carbons," which claims the benefit of and priority to U.S. Provisional Application 62/313,960, filed on Mar. 28, 2016, and U.S. Provisional Application 62/412,502, filed Oct. 25, 2016. Each of these applications is hereby incorporated by reference in its entirety.

FIELD

This invention is in the field of low temperature pyrolytic processing of carbon precursors to form graphene rich, optionally also nitrogen rich, carbon powders. This invention relates generally to the forming of graphenic carbons below 800° C.

BACKGROUND

Graphene comprising powders can be used, for example, in electrodes of supercapacitors, fuel cells and batteries, as lubricants, coatings that selectively reflect or absorb electromagnetic radiation, gas separation membranes, catalysts and packings of separation e.g. distillation columns, and adsorption of water, carbon dioxide, and other gases. While their advantageous properties are well known, their method of production, e.g. by exfoliating graphite, precluded their extensive use.

SUMMARY

Provided herein are methods of forming graphene-rich carbons. In general, the graphene-rich carbons are formed pyrolytically using precursor salts, the salts comprising oxygen and metal cations. The carbons can be optionally nitrogen-doped. For example, nitrogen-doped carbons can be formed by pyrolyzing salts, the anions of the salts comprising carbon, oxygen and optionally also nitrogen, their cations being ionized metals, such as $Me^{3+}$ or $Me^{4+}$ where Me is a metallic element, or metal oxides, such as $Me_xO_y^{n+}$ where Me is a metallic element. Upon pyrolysis in an inert atmosphere, the cations can be converted into a crystalline metal oxide on which the carbon formed in the pyrolysis is templated. The crystalline oxide lattice can have a hexagonal point group symmetry with a six-fold axis of rotation. It is exemplified by $La_2O_3$, having a double hexagonal close-packed crystal structure, space group No. 164, P-3m1. The hexagonal symmetry of the templating metal oxide may enhance the formation of graphene sheets at a temperature that is low enough to prevent graphitization, meaning the extensive stacking and organization of the graphene sheets in the direction perpendicular to their planes, referred to as the "c" axis. Graphenic sheets that are not extensively stacked and organized along the "c" axis form below about 875° C. or below about 800° C., for example between 500° C. and 800° C., for example between 600° C. and 800° C., or at about 710±40° C. The carbons may be porous, yet their tap density can be high.

The templating metal oxide can differ from previously used templating metal oxides, exemplified by MgO which is cubic, by its being hexagonal. An example of a carbon templating hexagonal metal oxide is lanthanum oxide $La_2O_3$. The templating metal oxide can be an oxide of a rare earth element, of a lanthanide, of yttrium, of scandium or any mixture of these. Other examples of hexagonal templating metal oxides may include oxides of manganese, vanadium, antimony, titanium, zirconium, hafnium, niobium, tantalum, tungsten, molybdenum and indium. The graphene comprising carbons can be formed by heating salts with anions containing oxygen, carbon, and optionally nitrogen. Nitrogen usually escapes when the pyrolysis temperature is high. When the carbon is templated with a hexagonal metal oxide, the pyrolysis temperature can be low enough for a large part of the optional nitrogen to remain in the carbon, such that the graphene-rich carbon contains more than 5 weight % structural nitrogen, such as more than 7 weight % or more than 9 weight %, or even up to 15 weight % structural nitrogen.

The disclosure provides methods of forming a carbonaceous material, such as a carbon powder (e.g., a carbon powder comprising graphene sheets), by heating or pyrolyzing a salt in the absence of air or oxygen at a temperature between 500° C. and 800° C., such as a salt comprising carbon, oxygen, and a metal ion. During the reaction the metal may react with the oxygen to form a templating metal oxide. Optionally, the templating metal oxide may be removed through an acid extraction process, where, for example, the templating metal oxide is dissolved into a liquid phase while the carbon is retained in a solid phase, which can be collected, washed, and dried. The lattice of the templating metal oxide is hexagonal, having a six-fold axis of rotational symmetry, which may advantageously provide enhancements to forming graphene or nitrogen doped graphene, which may include hexagonal structural elements (e.g., 6-membered rings).

The hexagonal templating metal oxide can comprise a rare-earth oxide, such as lanthanum oxide, neodymium oxide, or cerium oxide, or a mixture of these. Alternatively, the templating hexagonal metal oxide can comprise an oxide of yttrium, scandium, titanium, zirconium, thorium, tin, antimony, indium, niobium, tantalum, chromium, molybdenum, or tungsten.

The pyrolysis temperature can be low, such that little or no graphite is formed; it can be between 660° C. and 760° C.

Optionally, the pyrolyzed salt can comprise also nitrogen, so that nitrogen-comprising and graphene sheet-comprising carbons are formed. When the precursor contains nitrogen, the resulting graphene can be nitrogen-doped. The nitrogen content of the carbon can be greater than 5 percent by weight, such as greater than 7 percent by weight, such as greater than 9 percent by weight.

The acid used to extract the templating metal oxide can be an aqueous acid, such as a solution of an organic acid or a mineral acid. Use of an aqueous acid for extracting the templating metal oxide may be advantageous for separating the formed carbonaceous material from the metal oxide, and may further allow the metal in the metal oxide to be recycled for use in further pyrolysis reactions for forming additional graphene, for example.

Typically, the formed graphene sheets are not extensively stacked to form graphite. There can be on the average fewer than 20 sheets per stack, such as fewer than 10 sheets on the average, or even only as few as 5 sheets, or even 4 or less. It will be appreciated that a graphene stack may refer to multiple planar graphene structures, layers, or sheets arranged parallel or substantially parallel in a stacked configuration. In contrast to graphite, a graphene stack includes only a small number of sheets, such as between 2 and 20. In contrast to graphene that is not stacked (or unstacked), a graphene stack includes multiple graphene layers while unstacked graphene may refer to a single graphene layer.

The specific surface area of the carbon powder can be greater than about 400 m$^2$/g and the tap density of the carbon can be greater than 0.5 g/mL. Such materials properties may allow the formed carbon to be employed in gas and water vapor adsorption applications. For example, the graphene-rich carbon may exhibit advantageous utility in adsorbing non-reactive gases, such as $N_2$, Ar, $CO_2$, and the like. It will be appreciated that these properties may further allow the formed carbon to employed in other applications, such as catalysis, contaminant removal, filtration, electrochemical cell electrode components, etc.

A nitrogen-doped graphene-rich carbon that can have a surface structural nitrogen content of about 5 atom percent or more, for example 6 atom percent or more, such as 7 atom percent or more, such as 8 atom percent or more can be made by pyrolyzing, for example at or about 710° C., LaNTA, where NTA is the nitrilotriacetate anion. Optionally, the nitrogen-doped carbon has a specific surface area of about 200 m$^2$/g or more, for example 400 m$^2$/g or more, such as 800 m$^2$/g or more. Optionally, the nitrogen-doped carbon has a tap density greater than about 0.5 g/mL, for example 0.75 g/mL or more, such as about 1 g/mL or more. Optionally, the surface structural nitrogen content at least partly corresponds to nitrogen atoms covalently bound within the nitrogen-doped carbon. Optionally, the nitrogen-doped carbon has a bulk structural nitrogen content of about 7 weight percent or more, for example 8 weight percent or more, such as 9 weight percent or more or between about 8 weight percent and about 12 weight percent. Optionally, the nitrogen-doped carbon exhibits about 15 percent nitrogen by weight or less.

The earlier extensively used templating MgO was cubic; it had the NaCl structure, of space group Fm3m. In one aspect of this invention, graphene rich carbons are formed by pyrolyzing an oxygen containing precursor at a pyrolysis temperature below 800° C., for example between 500° C. and 800° C., for example between 600° C. and 800° C., below the graphitization temperature of 1200° C.-2500° C.

$La_2O_3$ is hexagonal of space group P-3m1. Instead of forming MgO using magnesium citrate a hexagonal $La_2O_3$ may be formed using lanthanum nitrilotriacerate monohydrate (LaNTA), for example, and pyrolyzing at about 710° C. Such a process may advantageously allow for forming a graphenic carbon that is highly polar, i.e. it is heavily nitrogen doped and comprises minimally stacked graphene planes. There may only be about 4 graphene planes per stack and the planes may contain as much as 9.7 weight % nitrogen. Graphene formed on the templating hexagonal $La_2O_3$ at 710° C. may allow for little of the nitrogen from the nitrilotriacetate to be lost. Without wishing to be bound by any theory, it is believed that the hexagonal $La_2O_3$ may promote the preferred formation of hexagonal repeating unit graphene over tetrahedral carbon. Forming of the carbon at 900° C. instead of 710° C. may exhibit two undesirable effects: First, the number of graphene planes per stack was observed to increase from 4 to 25 (FIGS. 2A and 2B), i.e. pyrolysis at the higher temperature enhanced the stacking of the graphene planes that leads eventually to graphite, where the stacking is infinite. Second, the nitrogen content was observed to reduce to about 3.2 weight %.

The optionally nitrogen-doped graphene-rich carbon can have a structural surface nitrogen content of about 5 atom % or more. It may have a specific surface area of about 200 m$^2$/g or more, for example 400 m$^2$/g or more, such as 800 m$^2$/g or more. It can have a tap density greater than about 0.5 g/mL, for example 0.75 g/mL or more, such as about 1 g/mL.

Without wishing to be bound by theory, it is believed that the hexagonal metal oxide, such as $La_2O_3$, stabilizes the graphenic sheets. This is suggested by the following observation: when the 900° C. carbon, of which the $La_2O_3$ was acid leached, was heated to 1000° C. for 1 hour, a temperature still below the 1200-2500° C. graphitization temperature of amorphous carbon, its transmission electron micrographs showed little or no graphene, i.e. the carbon may have reverted, in the absence of supporting hexagonal $La_2O_3$, to an amorphous carbon.

It will be appreciated that there can be discussion herein of beliefs or understandings of underlying principles relating to the invention without limiting the invention according to those beliefs or understandings. It is recognized that regardless of the ultimate correctness of any mechanistic explanation or hypothesis, an embodiment of the invention can nonetheless be operative and useful.

DETAILED DESCRIPTION

I. General

The present description provides techniques for preparing a variety of graphene-rich carbons, including nitrogen doped graphene-rich carbons, which may include a structural nitrogen content of about 5 atom percent or more. The formed graphene-rich carbons may have a specific surface area of about 200 m$^2$/g or more or a tap density greater than about 0.5 g/mL. For example, the tap density may be about 0.7 g/mL or more, about 0.8 g/mL or more, about 0.9 g/mL or more or between about 0.5 g/mL and about 1.0 g/mL, or even greater than 1 g/mL. Exemplary specific surface areas may be about 400 m$^2$/g or more, about 700 m$^2$/g or more, or about 1000 m$^2$/g or more.

"Carbon" or "carbonaceous material" refer to a non-volatile material comprising at least 50 atom percent structural carbon atoms. Nitrogen-doped carbons comprise structural nitrogen. Carbons may optionally comprise structural oxygen, or hydrogen, boron, or other elements.

"Hexagonal" refers to a structural arrangement of materials, such as a crystalline oxide lattice, wherein the point group symmetry has a sixfold axis of rotation. It is exemplified by La$_2$O$_3$ having a double hexagonal close-packed crystal structure, space group No. 164, P-3m1.

The graphene rich carbon may include a plurality of pores. The pores may be varied in size and may include, for example, a pore of a first characteristic dimension and a pore of a second characteristic dimension.

The present disclosure includes embodiments of carbons where one or multiple nitrogen atoms are present in five- or six-membered graphenic rings, such as a heterocyclic ring. The rings may include five-member rings, six-membered rings, and larger rings. Nitrogen or oxygen atoms may also be present in fragmented rings or straight or branched chains of carbon and nitrogen atoms. Additionally, oxygen atoms may be included in the structure, such as incorporated directly within a five- or six-membered (or greater) ring.

For example, in some embodiments, a nitrogen-doped graphene rich carbon may have a surface structural nitrogen content of about 5 atom percent or more. The surface structural nitrogen content may at least party correspond to nitrogen atoms covalently incorporated into a chemical structure of the nitrogen-doped carbon and positioned at a surface of the nitrogen-doped carbon. This nitrogen content may be variable depending on the reagents and processing conditions used to make the nitrogen-doped carbon. For example, in some embodiments, the surface structural nitrogen content may be 6 atom percent or more, 7 atom percent or more, 8 atom percent or more, between about 8 atom percent and about 12 atom percent, such as between about 8 atom percent and 10 atom percent.

In addition to its structural surface nitrogen, a nitrogen-doped carbon typically has nitrogen atoms present throughout its structure, i.e., in its bulk. For example, the nitrogen atoms may be incorporated below the surface. In some embodiments, the nitrogen-doped carbon has a bulk structural nitrogen content of about 7 weight percent or more, about 8 weight percent or more, about 9 weight percent or more, between about 8 weight percent and about 12 weight percent, such as between about 8 weight percent and about 10 weight percent.

II. Methods of Making Graphene-Rich, but Not Graphitized, Optionally Nitrogen-Doped Carbons Methods for making graphene-rich, but not graphitized, optionally nitrogen-doped carbons are also provided herein. In embodiments, a method of making a graphene-rich carbon may comprise obtaining an oxygen-containing, and optionally also nitrogen-containing, metal organic salt, such as a salt of an inorganic, i.e., metallic element, cation and an organic anion, and heating the salt to drive a chemical reaction in which the carbon and a metal oxide are formed as reaction products. Heating may correspond to pyrolyzing the metal organic salt, such as in an inert atmosphere where no air or oxygen is present. In embodiments, the resultant carbon may correspond to any of the graphene-rich and/or nitrogen-doped carbons described herein. For example, the carbon may have a structural nitrogen content in its surface of about 5 atom percent or more. The carbon may have a specific surface area of about 200 m$^2$/g or more, such as about 400 m$^2$/g or more. The carbon may have a tap density greater than about 0.5 g/mL.

In embodiments, certain properties of the resultant carbon may be controlled by modifying the pyrolysis conditions and selection of the composition of the metal organic salt. For example, in embodiments, all or part of the pyrolyzing may take place at temperatures of between about 650° C. and about 800° C., between about 650° C. and about 750° C., or about 710° C. Optionally, the metal organic salt comprises a nitrogen and carbon containing anion, such as nitrilotriacetate anion. The cation can be for example, of a lanthanide, of scandium, of gallium, or titanium and it can comprise an oxide of tungsten, molybdenum, zirconium, hafnium, tantalum or niobium. The cation may be trivalent, for example. In general, after pyrolysis, the oxide of the metal can be hexagonal or exhibit a hexagonal crystalline lattice.

After pyrolysis, the carbon may be exposed to various treatments. For example, in embodiments, after the pyrolyzing step, which can include forming a metal oxide and the carbon from the metal organic salt, the formed carbon may be treated with an acid, such as a mineral acid, to dissolve the metal oxide and to extract most, but optionally not all, of the metal oxide from the carbon. After extraction of most of the metal oxide, the carbon can be rinsed with water or with an aqueous solution, such as solution of an organic acid or base to remove the excess mineral acid.

Figure 1:
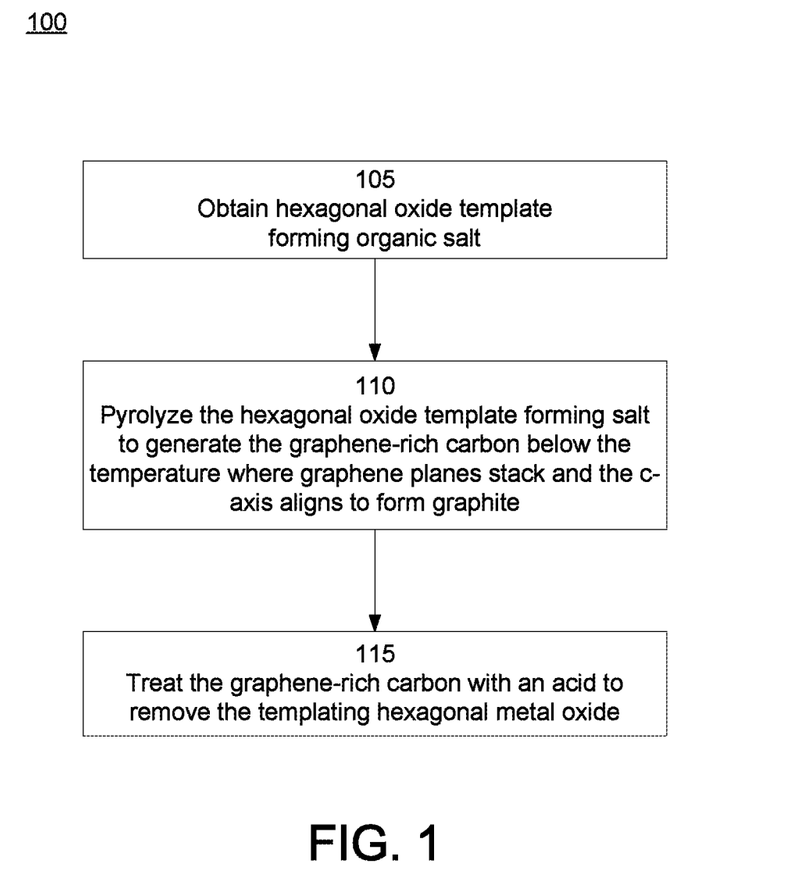
FIG. 1 provides an overview of an example method of making a carbonaceous material.

FIG. 1 provides an overview of a method 100, in accordance with various embodiments. In one aspect, FIG. 1 provides a method of making a graphene-rich, optionally heavily nitrogen-doped carbon. It will be appreciated that method 100 may contain additional or fewer steps than those illustrated in FIG. 1.

At block 105, an optionally nitrogen-containing organic salt is obtained. Such a salt may be synthesized, for example, or otherwise provided. At block 110, the salt of is pyrolyzed to generate the graphene-rich but not graphitic, and optionally nitrogen-doped, carbon. At block 115, the graphene-rich carbon is optionally treated with an acid to remove the templating hexagonal metal oxide that is formed in the pyrolysis process.

The invention may be further understood by the following non-limiting examples.

EXAMPLE 1

Figure 4:
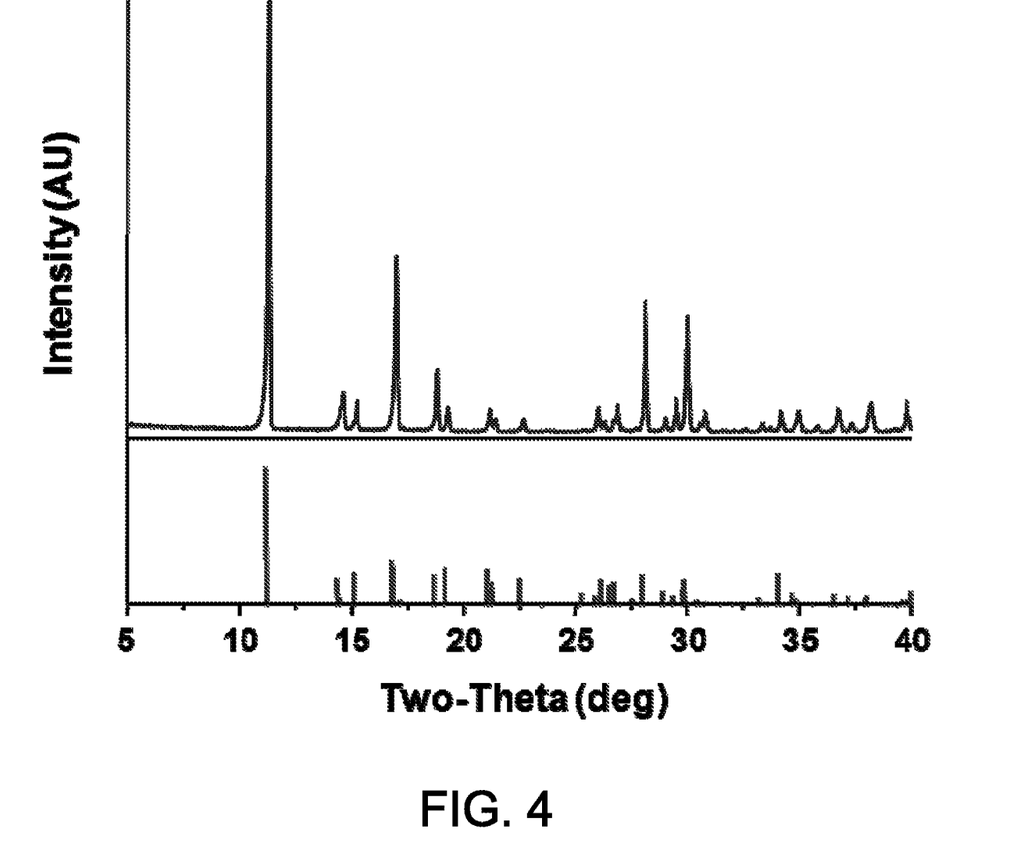
FIG. 4 provides the x-ray diffraction pattern of the LaNTA.H$_2$O salt used for making nitrogen-doped graphene-rich carbons in accordance with some embodiments and the authenticating reference pattern of the compound.

Synthesis of LaNTA.H$_2$O. Lanthanum (III) acetate hydrate (La(OAc)$_3$.xH$_2$O, Aldrich, Saint Louis, Mo., USA) (0.05 mol) was dissolved in 500 mL of DI water, and the solution was filtered (P4-P5 filter paper, Fisher Scientific, USA) to remove insoluble matter. The filtrate was poured into a 1 L round-bottomed flask. A precipitate formed when solid disodium nitrilotriacetate (Na$_2$NTA, Aldrich) (0.05 mol) was added to the filtrate. The mixture was refluxed with stirring for 12 h, then cooled to ambient temperature. The white precipitate was collected by filtration, and washed with 1 L of DI water. The precipitate was purified by refluxing for 2 h in 500 mL of DI water, then collected by filtration, washed with 2 L of DI water, and dried overnight at 110° C. The yield typically was ≥90%. The dried crystals were determined to be phase-pure LaNTA.H$_2$O (FIG. 4) by powder X-ray diffraction (X'PERT theta-theta diffractometer, PANalytical, Westborough, Mass., USA).

Pyrolysis of LaNTA.H$_2$O and La$_2$O$_3$ Extraction. LaNTA.H$_2$O (~15 g) was placed in a covered, 50 mL alumina crucible (65504 and 65611, Coorstek, Houston, Tex., USA). The crucible was placed in an alumina boat, which was carefully slid into a capped, 80 mm diameter quartz tube in a horizontal tube furnace (Model OTF-1200X, MTI Corp, Richmond, Calif., USA). After preheating the tube to 35° C. and purging it with argon at a flow rate of ~120 cm$^3$/min for 50 min, the tube temperature was increased to 300° C. at 10° C./min, then to 600° C. at 2° C./min, and then to 710° C. or 900° C. at 10° C./min, where it was held for 1 h. The pyrolyzed material was allowed to cool to ambient temperature under argon. It was transferred from the crucible into 1 L of 1 M H$_2$SO$_4$, and this slurry was stirred 5 h to dissolve the formed La$_2$O$_3$. The carbon slurry was filtered, washed with 2 L DI water, and dried at 130° C. overnight. Materials were pyrolyzed at 710° C. or 900° C. A portion of the material pyrolyzed at 900° C. was heated under argon to 1000° C. at 5° C./min, where it was held for 1 h. The carbon pyrolyzed at 710° C. is referred to as the "La$_2$O$_3$-templated, 9.7 wt % structural nitrogen" carbon. The carbon pyrolyzed at 900° C. had a lesser bulk and surface nitrogen content and is referred to as the "La$_2$O$_3$-templated, 3.1 wt % structural nitrogen" carbon. The carbon pyrolyzed at 900° C. then heated under argon to 1000° C. had the lowest bulk and surface nitrogen content is referred to as the "La$_2$O$_3$-templated, 1.2 wt % structural nitrogen" carbon.

The yield decreased as the pyrolysis temperature increased. The decrease was attributed to the increase in the TΔS term in the free energy of reaction at the higher temperature. In this view, as the pyrolysis temperature increased, TΔS increased and more diatomic molecules (CO, N$_2$) were produced (Reaction 1); correspondingly, at a lower temperature, where TΔS was smaller, more triatomic molecules (H$_2$O, CO$_2$) were produced (Reaction 2). In the extreme case, the carbon yields in the two reactions could differ by a full order of magnitude.

$$C_{12}H_{16}N_2O_{14}La_2 \rightarrow La_2O_3 + N_2 + 11CO + 7H_2 + C \quad (1)$$

$$C_{12}H_{16}N_2O_{14}La_2 \rightarrow La_2O_3 + N_2 + 2CO_2 7H_2O + 10C \quad (2)$$

Elemental analyses were performed by Galbraith Laboratories (Knoxville, Tenn., USA). For total carbon and hydrogen, the samples were encapsulated, combusted and assayed with a PerkinElmer 2400 Series II CHNS/O analyzer or a LECO CHN628 analyzer. For total oxygen, the samples were encapsulated, combusted and assayed with a Thermo FlashEA 1112 analyzer. The total oxygen and total hydrogen assays detected these elements in any form, including, constitutional, sorbed, and in water absorbed by the samples from ambient air. The portion of the total oxygen and hydrogen that was water was calculated from Karl Fischer water assays and subtracted from total values to obtain the water-free values. For constitutional nitrogen, the sample was assayed by the Kjeldahl method, which does not detect sorbed molecular N$_2$.

Figure 2A:
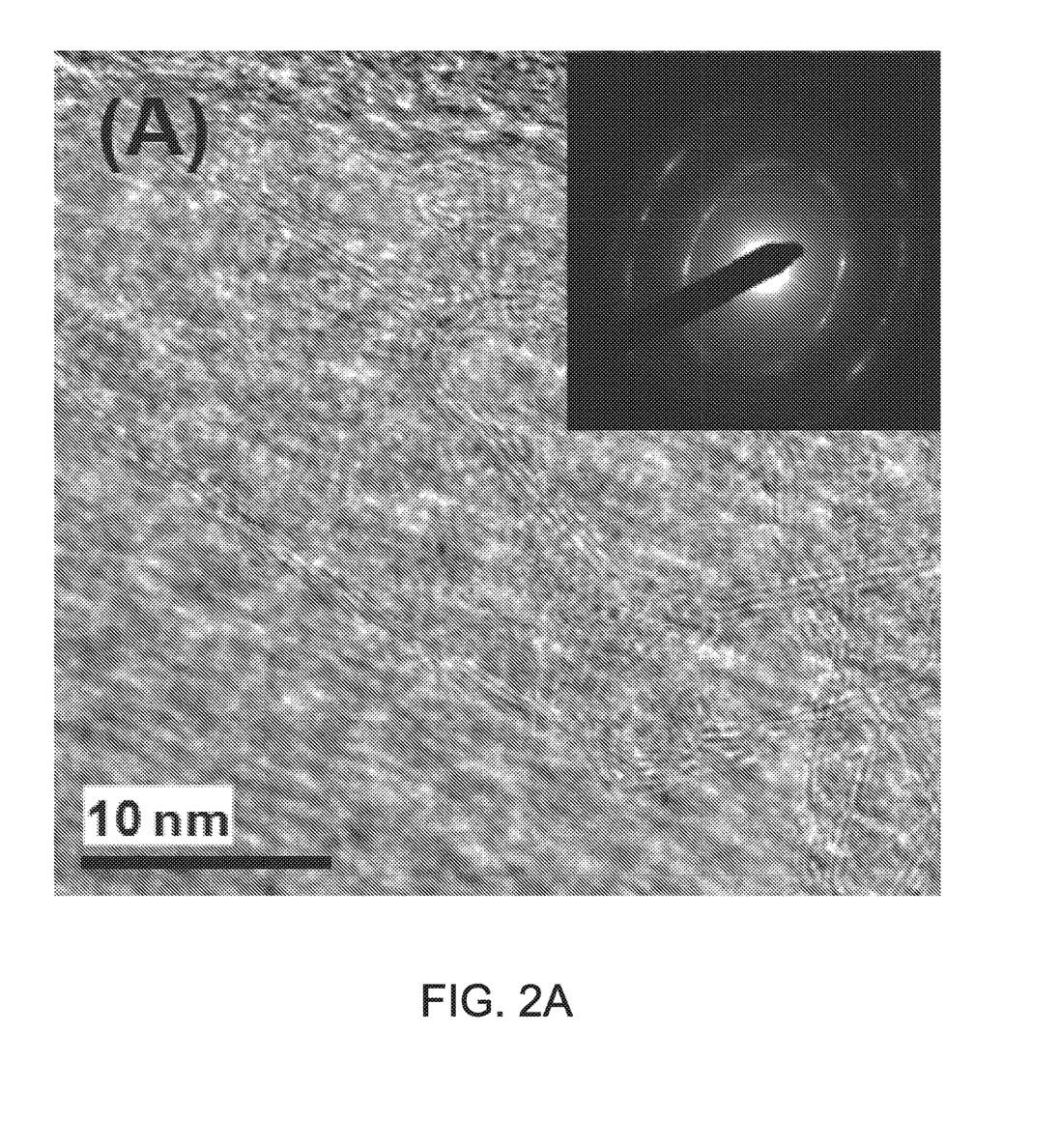
FIGS. 2A and 2B provide high-resolution transmission electron micrograph (TEM) images and the corresponding selected area electron diffraction (SAED) patterns (insets) of the $La_2O_3$-templated (a) formed at 710° C., containing 9.7 wt. % nitrogen; (b) formed at 900° C., containing 3.1 wt. % nitrogen. The former has only ~4 stacked graphene sheets, whereas the latter has ~25 stacked graphene sheets. The SAED of the 9.7 wt. % structural nitrogen-containing carbon is oval, because the graphene sheets are tilted with respect to the beam.
Figure 2B:
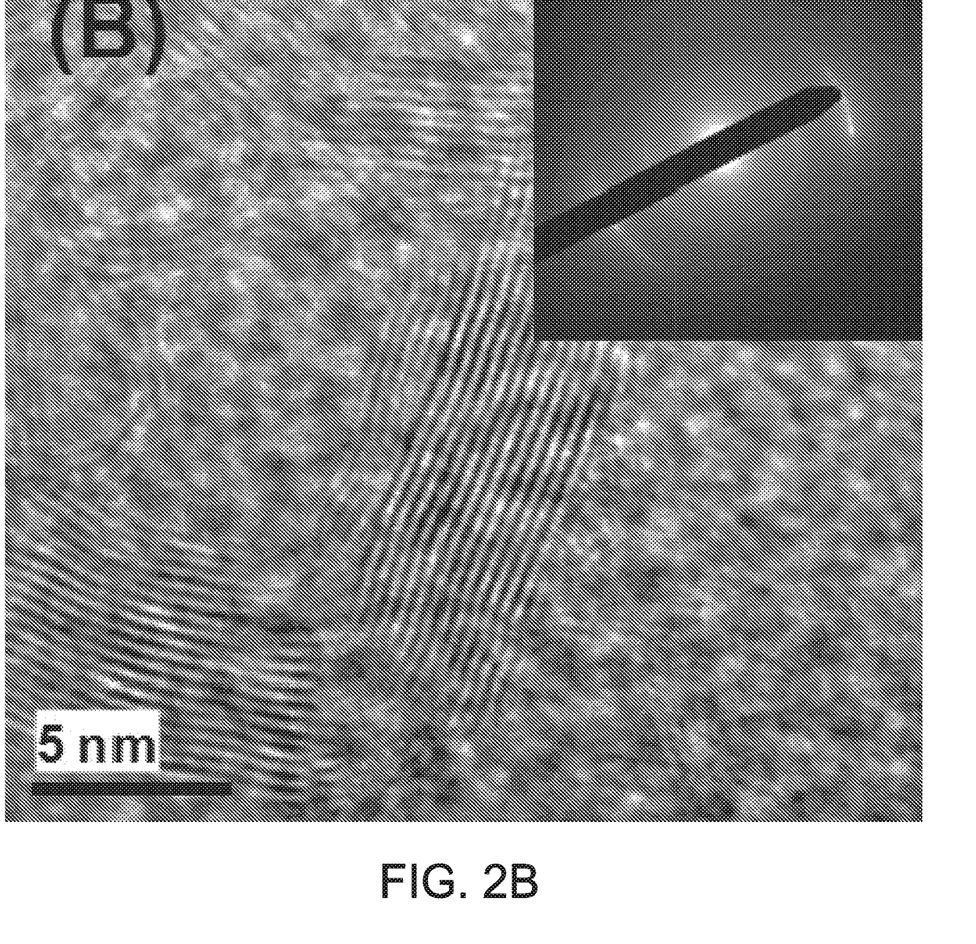

Two La$_2$O$_3$-templated carbons with surfaces comprising 7.9 atom % and 3.3 atom %, their respective structural bulk nitrogen content being 9.7 wt. %, 3.1 wt. %, were formed by pyrolyzing respectively for 1 hour at 710° C. or at °900 C. Their transmission electron micrographs (TEMs) and electron diffraction patterns are shown in FIGS. 2A and 2B. The micrographs and diffraction patterns show graphenic planes that are less stacked in the carbon formed at the lower temperature, with only about 4 graphene layers being stacked, than at the higher temperature, where about 25 layers are stacked. The graphene sheets are not aligned in the axis perpendicular to the planes, implying that graphite, where the graphene planes are aligned, is not formed.

After heating of the 900° C. graphenic carbon, of which the La$_2$O$_3$ was acid-extracted, to 1000° C. for 1 hour, the TEMs no longer showed graphenic planes and the electron diffraction patterns showed no discernible ordering. The surface nitrogen atom percentage dropped to 1.4 atom % and bulk nitrogen content to 1.2 wt. %.

Three La$_2$O$_3$-templated carbons, containing 9.7 wt. % structural nitrogen, 3.1 wt. % structural nitrogen, and 1.2 wt. % structural nitrogen were synthesized by pyrolyzing crystallographically pure lanthanum nitrilotriacetate monohydrate (LaNTA.H$_2$O) and dissolving the La$_2$O$_3$ in acid. The structural nitrogen of the carbons was provided by the NTA; their pore structures were defined by the templating La$_2$O$_3$ and the pyrolysis temperature.

The 1-hour pyrolysis temperatures of the carbons containing 9.7 wt. % and 3.1 wt. % structural nitrogen were respectively 710° C. and 900° C.; the 1.2 wt. % structural nitrogen-containing carbon was made by pyrolyzing the 3.1 wt. % structural nitrogen-containing carbon at 1000° C. for 1 hour. The three carbons contained respectively 5.4 wt. %, 5.0 wt. %, and 4.4 wt. % structural oxygen. Their respective apparent BET specific surface areas were 370 m$^2$/g, 1,460 m$^2$/g and 1,030 m$^2$/g.

TABLE 1

Specific surface areas and pore volumes of La$_2$O$_3$-templated carbons.

| | Carbon | Property | | |
|---|---|---|---|---|
| | | Specific Surface Area (m$^2$/g)[a] | Total pore volume (cm$^3$/g)[b] | Micropore volume (cm$^3$/g)[c] |
| A. | 710° C. La$_2$O$_3$-templated, 9.7 wt % structural nitrogen | 416 | 0.31 | 0.14 |
| B. | 900° C. La$_2$O$_3$-templated, 3.1 wt % structural nitrogen | 1462 | 2.17 | 0.5 |
| C. | Carbon B after its La$_2$O$_3$- was extracted and after heating to 1000° C. for 1 hour, 1.2 wt % structural nitrogen | 1028 | 1.39 | 0.35 |

[a]Calculated from the N$_2$ adsorption at 77K by the BET-2 method.
[b]Measured at P/Pq = 0.99.
[c]Calculated by the Dubinin-Radushkevich method.

Table 1 provides the specific surface areas and pore volumes of the carbons. The 9.7 wt. % structural nitrogen-containing carbon had the lowest total specific surface area, pore volume and micropore volume. Its specific surface area is about ¼th of that of the 3.1 wt. % structural nitrogen-containing carbon and about ⅓rd of that of the 1.2 wt. % structural nitrogen-containing carbon. Its total pore volume is about ⅐th of that of the 3.1 wt. % containing carbon and ⅕th of the 1.2 wt. % structural nitrogen-containing carbon. Its micropore volume is also the smallest, about ¼th of that of the 3.1 wt. % structural nitrogen-containing carbon and about ⅓rd of that of the 1.2 wt. % structural nitrogen-containing carbon.

FIGS. 2A and 2B show high-resolution transmission electron (HRTEM) micrographs and selected area electron diffraction (SAED) patterns of the 9.7 wt. % structural nitrogen-containing carbon and of the 3.1 wt. % structural nitrogen-containing carbon. Both displayed two-dimensionally ordered graphene-like structures. As seen in the SAED patterns the stacked graphene-like sheets differed from graphite by the absence of c-axis alignment, i.e. the absence of three-dimensional graphitic sheet ordering. The graphene sheets of the 9.7 wt. % structural nitrogen-containing carbon were less developed and had thinner edges than those of the 3.1 wt. % structural nitrogen-containing carbon.

Figure 3:
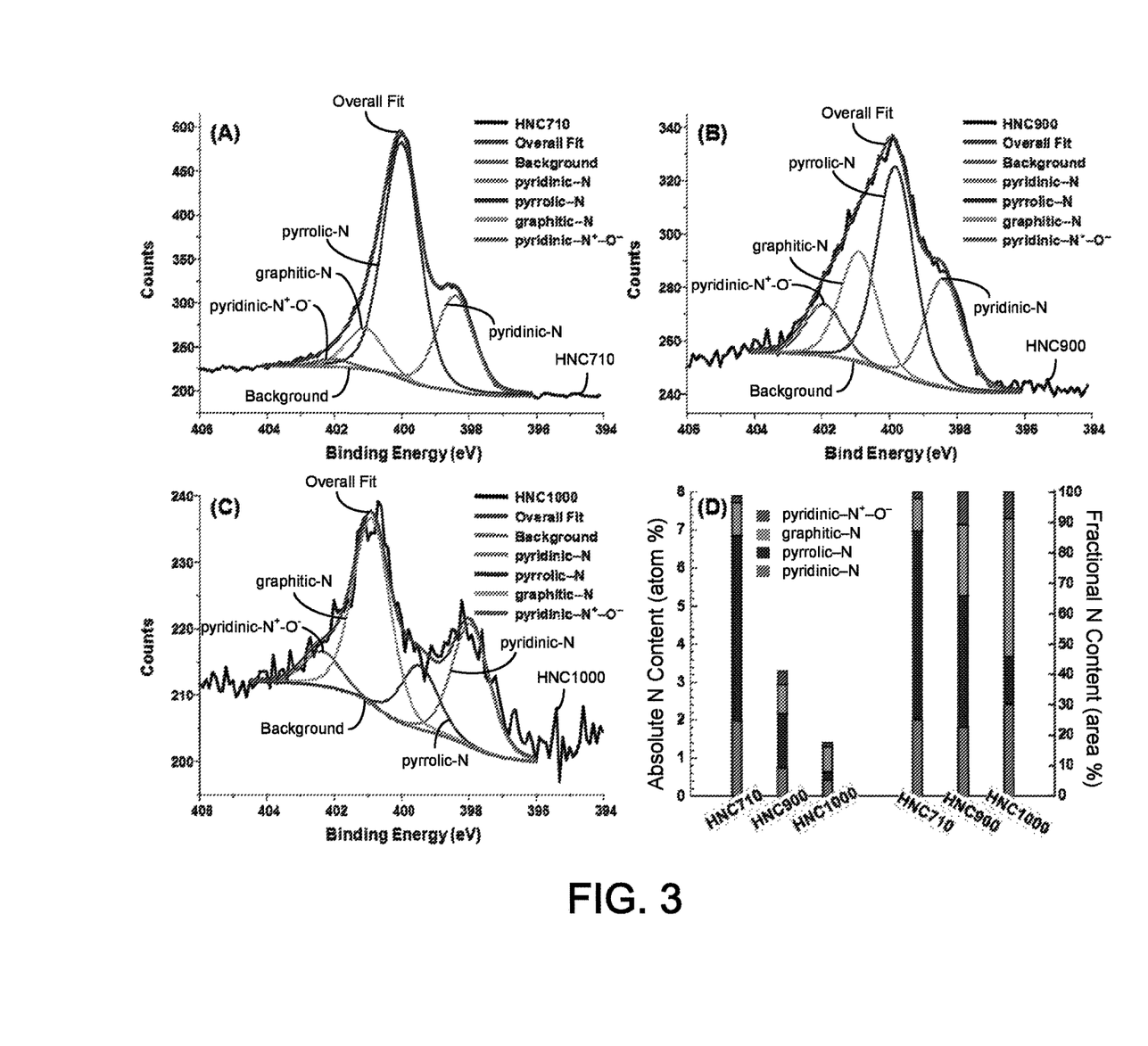
FIG. 3. Shows the deconvoluted high-resolution XPS N(1s) spectra of the 9.7 wt. % structural nitrogen-containing carbon (Panel A); the 3.1 wt. % structural nitrogen-containing carbon (Panel B); and the 1.2 wt. % structural nitrogen-containing carbon (Panel C), and atom percentages of their nitrogen types (Panel D).
Figure 5:
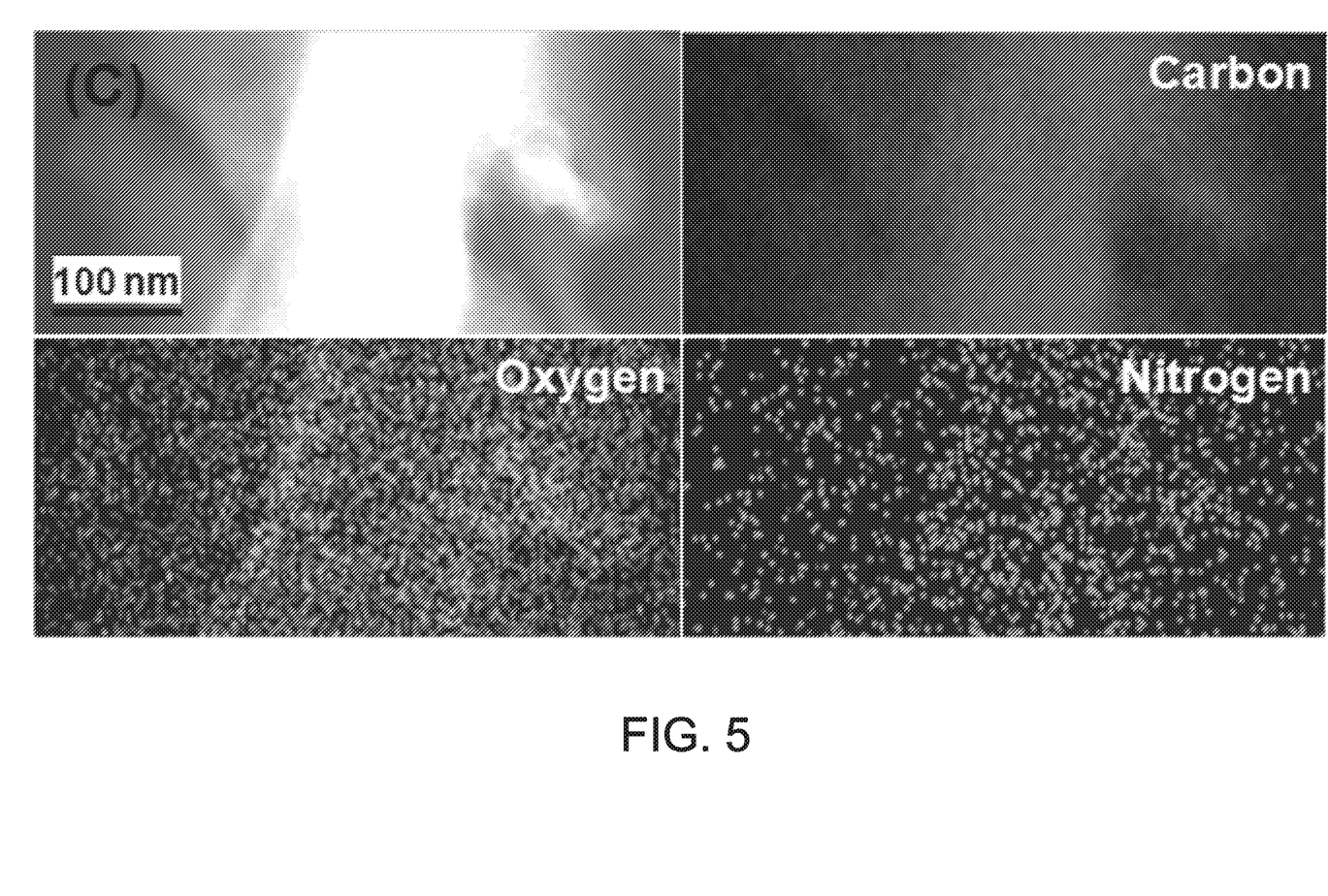
FIG. 5 provides energy dispersive x-ray spectroscopic (EDS) elemental mapping images of the heavily nitrogen-doped 9.7 wt. % structural nitrogen-containing graphene rich carbon showing that the carbon, the nitrogen and the oxygen are about uniformly distributed.

Table 2 lists the bulk compositions of the carbons stored in ambient air. The bulk nitrogen content, determined by the Kjeldahl method, measures only the constitutional nitrogen, not adsorbed $N_2$. The 9.7 wt. % structural nitrogen-containing carbon contained 13.1 wt. % water, assayed by the water-specific Karl Fischer method; the 3.1 wt. % structural nitrogen-containing carbon contained 5.0 wt. %; and the 1.2 wt. % structural nitrogen-containing carbon had only <0.5 wt. %. These values, agreed with the drying values obtained through thermogravimetry in the initial heating half cycles. The 9.7 wt. % structural nitrogen-containing carbon contained only slightly more structural-constitutional oxygen than the others. EDS elemental mapping (FIG. 5), shows that the nitrogen and oxygen are uniformly distributed in the 9.7 wt. % structural nitrogen-containing carbon.

atoms. Their deconvolution into their four plausible components, pyridinic-N (398.2±0.3 eV), pyrrolic-N (400.0±0.3 eV), graphitic-N (401.1±0.3 eV) and pyridinic $N^+$—$O^-$ (402.1±0.3 eV) shows that the nitrogen atoms of the 9.7 wt. % structural nitrogen-containing carbon are primarily pyrrolic and secondarily pyridinic, and that those of the 3.1 wt. % structural nitrogen-containing carbon are primarily pyrrolic and secondarily graphitic and pyridinic. Both the total nitrogen content and the fraction of pyrrolic-N decrease when the pyrolysis temperature is raised from 710° C. to 900° C., while the fraction of graphitic-N increases. The 4.9 atom % pyrrole percentage in the surface of the 9.7 wt. % structural nitrogen-containing carbon is more than thrice the 1.4 atom % percentage in the 3.1 wt. % structural nitrogen-containing carbon.

TABLE 2

Bulk composition of the air-equilibrated of the $La_2O_3$-templated carbons.

| | | Carbon | | |
|---|---|---|---|---|
| Composition (wt %) | | Carbon A: 9.7 wt. % structural nitrogen | Carbon B: 3.1 wt. % structural nitrogen | Carbon C: 1.2 wt. % structural nitrogen |
| C | | 68.5 | 82.8 | 87.2 |
| N | Kjeldahl, excl $N_2$ | 9.7 | 3.1 | 1.2 |
| $H_2O$ | Karl Fischer | 13.1 | 5.0 | <0.5 |
| H | Excl. $H_2O$ | 1.0 | 0.6 | 0.6 |
| O | Excl. $H_2O$ | 5.4 | 5.0 | 4.4 |
| Total | | 97.7 | 96.5 | 93.4 |

Table 3 lists the XPS-measured surface compositions and the types of nitrogen on the surfaces of the three $La_2O_3$-templated carbons. The high resolution XPS spectra taken in ultra-high vacuum where all gases are desorbed are shown in FIG. 3, panels A, B, and C. The surface of the 9.7 wt. % or about 8.3 atom % structural nitrogen-containing carbon contains 7.9 atom % nitrogen, more than twice of the 3.1 wt. % or about 2.7 atom % bulk structural nitrogen-containing carbon, which contained only 3.3 atom % nitrogen in its surface; the 1.2 wt. % or about 1.0 atom % bulk structural nitrogen-containing carbon surface contained only 1.4 atom % nitrogen.

Statements Regarding Incorporation by Reference and Variations

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in this application (for example, a reference that

TABLE 3

Surface composition and nitrogen types (pyridinic-N, pyrrolic-N, graphitic-N, and pyridinic $N^+$—$O^-$) of the carbons by XPS.

| | Total atom % | | | Nitrogen Type | | | |
|---|---|---|---|---|---|---|---|
| Carbon | C | O | N | Pyridinic | Pyrrolic | Graphitic | $N^+$—$O^-$ |
| A. 710° C. $La_2O_3$-templated, 9.7 wt % structural nitrogen | 80.7 | 11.4 | 7.9 | 2.0 | 4.9 | 0.9 | 0.2 |
| B. 900° C. $La_2O_3$-templated, 3.1 wt % structural nitrogen | 88.6 | 7.7 | 3.3 | 0.8 | 1.4 | 0.8 | 0.3 |
| C. Carbon B after its $La_2O_3$-was extracted and after heating to 1000° C. for 1 hour, 1.2 wt % structural nitrogen | 97.6 | 1.00 | 1.4 | 0.4 | 0.2 | 0.6 | 0.1 |

The differences between the shapes of the N(1s) spectra in FIG. 3 indicate different bonding of the surface nitrogen is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "A, B, and/or C" is equivalent to "'A alone' or 'B alone' or 'C alone' or 'A and B' or 'A and C' or 'B, and C' or 'A, B, and C'".

Every formulation or combination of components described or exemplified can be used to practice the invention, unless otherwise stated. Specific names of materials are intended to be exemplary, as it is known that one of ordinary skill in the art can name the same material differently. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass, in addition to the open-ended description, those compositions and methods consisting essentially of and consisting of the recited components or elements. The invention illustratively described herein suitably may be practiced in the absence of any element or elements, limitation, or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Embodiments described herein can be combined in any combination, without limitation. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A method of forming a carbonaceous material, the method comprising:
   heating, in the absence of air or oxygen, a salt comprising carbon, oxygen, and one or more metal ions to a temperature between about 500° C. and about 875° C. to drive a chemical reaction involving the salt to form reaction products including the carbonaceous material and a carbon templating hexagonal metal oxide, the carbonaceous material comprising graphene sheets;
   contacting the reaction products with an organic acid or a mineral acid to dissolve the hexagonal metal oxide and form a liquid phase and a solid phase, the liquid phase comprising the metal ions and the solid phase comprising the carbonaceous material;
   separating the liquid phase and the solid phase; and
   drying the solid phase to form a dried carbonaceous material.

2. The method of claim 1, the chemical reaction corresponding to pyrolysis of the salt.

3. The method of claim 1, further comprising:
   recycling the metal ions in the liquid phase by converting the metal ions to additional salt comprising carbon, oxygen, and the metal ions; and
   pyrolyzing the additional salt to form additional carbonaceous material comprising additional graphene sheets.

4. The method of claim 1, wherein the organic acid or the mineral acid is an aqueous acid solution.

5. The method of claim 1, wherein a specific surface area of the dried carbonaceous material is about 400 $m^2/g$ or more or between about 400 $m^2/g$ and about 2000 $m^2/g$.

6. The method of claim 1, wherein a tap density of the dried carbonaceous material about 0.5 g/mL or more or between about 0.5 g/mL and about 1.5 g/mL.

7. The method of claim 1, wherein the graphene sheets are not stacked or wherein the graphene sheets are in stacks comprising, on average, 2 to 20 sheets.

8. The method of claim 1, the metal ions comprising a trivalent cation.

9. The method of claim 1, the carbon templating hexagonal metal oxide comprising yttrium, scandium, titanium, zirconium, thorium, tin, antimony, indium, niobium, tantalum, chromium, molybdenum, or tungsten.

10. The method of claim 1, the carbon templating hexagonal metal oxide having a crystal lattice with a six fold axis of rotational symmetry.

11. The method of claim 1, the salt comprising a rare earth ion and the carbon templating hexagonal metal oxide comprising a rare earth oxide.

12. The method of claim 11, the salt comprising a lanthanum salt and the carbon templating hexagonal metal oxide comprising lanthanum oxide.

13. The method of claim 11, the rare earth oxide comprising neodymium oxide or cerium oxide.

14. The method of claim 1, the salt further comprising nitrogen and the carbonaceous material further comprising nitrogen.

15. The method of claim 14, the carbonaceous material comprising about 5 percent nitrogen by weight or more or between about 5 percent nitrogen by weight and about 15 percent nitrogen by weight.

16. The method of claim 14, most or all of the nitrogen residing in heterocyclic rings associated with graphene sheets.

17. The method of claim 16, the carbonaceous material comprising heterocyclic rings of 5 atoms or 6 atoms.

18. A method of forming a carbonaceous material, the method comprising:
heating, in the absence of air or oxygen, a salt comprising carbon, oxygen, and one or more metal ions to a temperature between about 500° C. and about 875° C. to drive a chemical reaction involving the salt to form reaction products including the carbonaceous material and a trivalent metal oxide, the carbonaceous material comprising graphene sheets.

19. The method of claim 18, wherein the chemical reaction corresponds to pyrolysis of the salt.

20. The method of claim 18, wherein the temperature is between 500° C. and 800° C.

21. The method of claim 18, wherein the method further comprises:
contacting the reaction products with an organic acid or a mineral acid to dissolve the trivalent metal oxide and form a liquid phase and a solid phase, the liquid phase comprising the metal ions and the solid phase comprising the carbonaceous material,
separating the liquid phase and the solid phase, and
drying the solid phase to form a dried carbonaceous material.

22. The method of claim 21, wherein the method further comprises:
recycling the metal ions in the liquid phase by converting the metal ions to additional salt comprising carbon, oxygen, and the metal ions, and
pyrolyzing the additional salt to form additional carbonaceous material comprising additional graphene sheets.

23. The method of claim 21, wherein the organic acid or the mineral acid is an aqueous acid solution.

24. The method of claim 21, wherein a specific surface area of the dried carbonaceous material is about 400 m$^2$/g or more or between about 400 m$^2$/g and about 2000 m$^2$/g.

25. The method of claim 21, wherein a tap density of the dried carbonaceous material about 0.5 g/mL or more or between about 0.5 g/mL and about 1.5 g/mL.

26. The method of claim 18, wherein the graphene sheets are unstacked or not stacked or are in stacks comprising, on average, 2 to 20 sheets, 2 to 10 sheets, 2 to 5 sheets, or 2 to 4 sheets.

27. The method of claim 18, wherein the metal ions comprise a trivalent cation.

28. The method of claim 18, wherein the trivalent metal oxide comprises a carbon templating hexagonal metal oxide.

29. The method of claim 28, wherein the carbon templating hexagonal metal oxide comprises yttrium, scandium, titanium, zirconium, thorium, tin, antimony, indium, niobium, tantalum, chromium, molybdenum, or tungsten.

30. The method of claim 18, wherein the carbon templating hexagonal metal oxide has a crystal lattice with a six fold axis of rotational symmetry.

31. The method of claim 18, wherein the salt comprises a rare earth ion and the trivalent metal oxide comprises a rare earth oxide.

32. The method of claim 31, wherein the rare earth oxide comprises neodymium oxide or cerium oxide.

33. The method of claim 18, wherein the salt comprises a lanthanum salt and the trivalent metal oxide comprises lanthanum oxide.

34. The method of claim 18, wherein the salt comprises a nitrilotriacetate salt.

35. The method of claim 18, wherein the salt comprises nitrogen.

36. The method of claim 18, wherein the carbonaceous material comprises nitrogen.

37. The method of claim 18, wherein the carbonaceous material comprises about 5 percent nitrogen by weight or more or between about 5 percent nitrogen by weight and about 15 percent nitrogen by weight.

38. The method of claim 37, wherein most or all of the nitrogen resides in heterocyclic rings associated with graphene sheets.

39. The method of claim 18, wherein the carbonaceous material comprises heterocyclic rings of 5 atoms or 6 atoms.

40. A method of forming a carbonaceous material, the method comprising:
heating, in the absence of air or oxygen, a salt comprising carbon, oxygen, and one or more metal ions to a temperature between about 500° C. and about 875° C. to drive a chemical reaction involving the salt to form reaction products including the carbonaceous material and a carbon templating hexagonal metal oxide, the carbonaceous material comprising graphene sheets, wherein the metal ions comprise a trivalent cation.

41. The method of claim 40, the chemical reaction corresponding to pyrolysis of the salt.

42. The method of claim 40, further comprising:
contacting the reaction products with an organic acid or a mineral acid to dissolve the hexagonal metal oxide and form a liquid phase and a solid phase, the liquid phase comprising the metal ions and the solid phase comprising the carbonaceous material;
separating the liquid phase and the solid phase; and
drying the solid phase to form a dried carbonaceous material.

43. The method of claim 42, further comprising:
recycling the metal ions in the liquid phase by converting the metal ions to additional salt comprising carbon, oxygen, and the metal ions; and
pyrolyzing the additional salt to form additional carbonaceous material comprising additional graphene sheets.

44. The method of claim 42, wherein the organic acid or the mineral acid is an aqueous acid solution.

45. The method of claim 42, wherein a specific surface area of the dried carbonaceous material is about 400 m$^2$/g or more or between about 400 m$^2$/g and about 2000 m$^2$/g.

46. The method of claim 42, wherein a tap density of the dried carbonaceous material about 0.5 g/mL or more or between about 0.5 g/mL and about 1.5 g/mL.

47. The method of claim 40, the graphene sheets not stacked or in stacks comprising, on average, 2 to 20 sheets.

48. The method of claim 40, the carbon templating hexagonal metal oxide comprising yttrium, scandium, titanium, zirconium, thorium, tin, antimony, indium, niobium, tantalum, chromium, molybdenum, or tungsten.

49. The method of claim 40, the carbon templating hexagonal metal oxide having a crystal lattice with a six fold axis of rotational symmetry.

50. The method of claim 40, the salt comprising a rare earth ion and the carbon templating hexagonal metal oxide comprising a rare earth oxide.

51. The method of claim 50, the salt comprising a lanthanum salt and the carbon templating hexagonal metal oxide comprising lanthanum oxide.

52. The method of claim 50, the rare earth oxide comprising neodymium oxide or cerium oxide.

53. The method of claim 40, the salt further comprising nitrogen and the carbonaceous material further comprising nitrogen.

54. The method of claim 53, the carbonaceous material comprising about 5 percent nitrogen by weight or more or between about 5 percent nitrogen by weight and about 15 percent nitrogen by weight.

55. The method of claim 53, most or all of the nitrogen residing in heterocyclic rings associated with graphene sheets.

56. The method of claim 55, the carbonaceous material comprising heterocyclic rings of 5 atoms or 6 atoms.

* * * * *